US009946790B1

(12) United States Patent
Siegel et al.

(10) Patent No.: US 9,946,790 B1
(45) Date of Patent: Apr. 17, 2018

(54) CATEGORIZING ITEMS USING USER CREATED DATA

(71) Applicant: IMDB.com, Inc., Seattle, WA (US)

(72) Inventors: Hilliard Bruce Siegel, Seattle, WA (US); Jinesh Udaykumar Vora, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1179 days.

(21) Appl. No.: 13/869,525

(22) Filed: Apr. 24, 2013

(51) Int. Cl.
*G06F 17/30* (2006.01)

(52) U.S. Cl.
CPC ................. *G06F 17/3071* (2013.01)

(58) Field of Classification Search
CPC .................................................. G06F 17/3071
See application file for complete search history.

(56) References Cited

U.S. PATENT DOCUMENTS

| | | | | |
|---|---|---|---|---|
| 9,047,283 | B1* | 6/2015 | Zhang | G06F 17/30663 |
| 9,286,391 | B1* | 3/2016 | Dykstra | G06F 17/30864 |
| 2003/0126128 | A1* | 7/2003 | Watson | G06F 17/218 |
| 2004/0024739 | A1* | 2/2004 | Copperman | G06F 17/30616 |
| 2007/0118515 | A1* | 5/2007 | Dehlinger | G06F 17/30728 |
| 2007/0250468 | A1* | 10/2007 | Pieper | G06F 17/30867 |
| 2008/0133541 | A1* | 6/2008 | Fletcher | G06F 17/30734 |
| 2008/0288494 | A1* | 11/2008 | Brogger | G06Q 30/02 |
| 2009/0012991 | A1* | 1/2009 | Johnson | G06Q 30/02 |
| 2009/0089372 | A1* | 4/2009 | Sacco | G06F 17/3089 709/204 |
| 2011/0153423 | A1* | 6/2011 | Elvekrog | G06Q 30/02 705/14.53 |
| 2012/0166441 | A1* | 6/2012 | Karidi | G06F 17/3071 707/740 |

* cited by examiner

*Primary Examiner* — Huawen A Peng
(74) *Attorney, Agent, or Firm* — Thomas | Horstemeyer, LLP

(57) ABSTRACT

Disclosed are various embodiments for identifying relationships between items included in user-created item lists and a predefined set of keywords based at least in part upon a comparison of the item list titles and the keywords. Each item lists title may be compared with the set of keywords to determine if any of the title terms in the item list title matches any of the keywords. If a match is detected, each of the items included in the item list are associated with the matching keyword. Items that are associated with a particular keyword based on the comparison may be added to an item category corresponding to the keyword.

20 Claims, 6 Drawing Sheets

CATEGORIZING ITEMS USING USER CREATED DATA

BACKGROUND

Categorization of items involves placing groups of items into different categories based on some sort of determined relationship. Items may be placed into specific categories based on a relationship between the item and the type of item category. However, occasionally items that should be placed in a particular category fail to be identified for that category due to lack of data associated with the item that describes the relationship.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
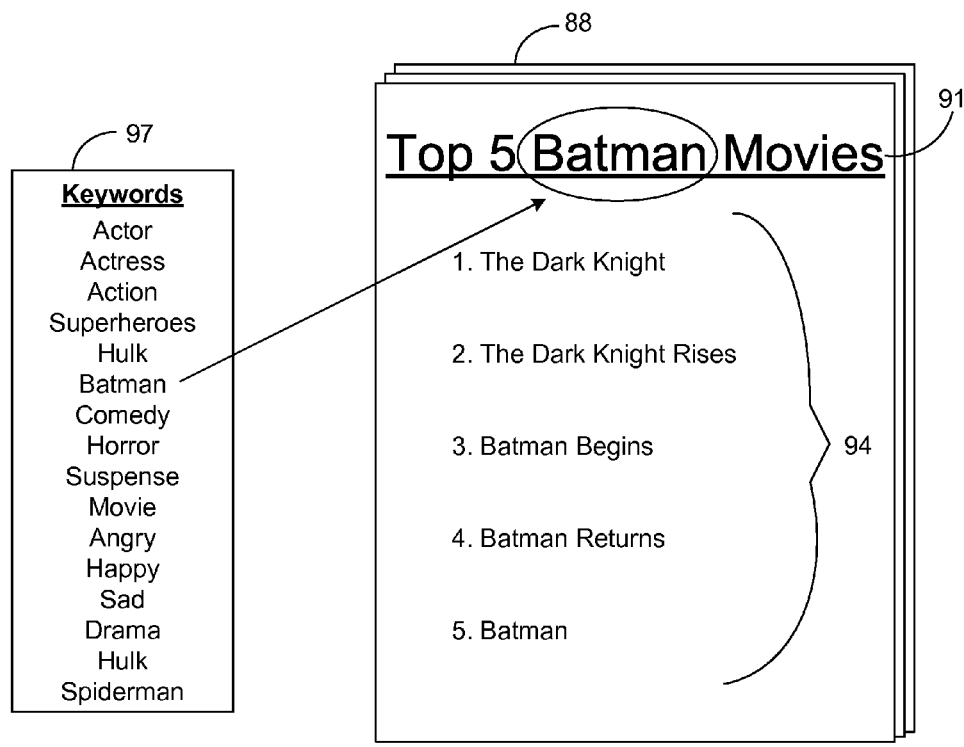
FIG. 1 is a drawing showing a relationship between keywords and lists of items according to an embodiment of the present disclosure.

The present disclosure relates to identifying relationships between items that are included in user-created item lists and a set of predefined keywords. As used herein, the term "item" may include media, services, products, goods, and/or other type of item that may be categorized. With reference to FIG. 1, shown is an example of one item list 88 from a registry of multiple item lists 88 having an item list title 91 and listing a group of items 94. FIG. 1 illustrates the detection of a matching keyword 97 (e.g. "Batman") in an item list title 91. The detection of the matching keyword 97 identifies a relationship between the items 94 and the keyword 97 since the keyword 97 appears in the item list title 91. For example, the use word "Batman" in the item list title 91 illustrates that the items 94 included in the shown item list 88 all relate to the word "Batman."

Users may create item lists 88 in order to record and share their own personalized characterization of items 94. The item lists 88 may be included in various types of electronic applications that may include information relating to the items 94 and/or provide the ability to purchase and/or download the items 94. Each user may define the relationship between items 94 included in their respective item list(s) 88 by creating an item list title 91 that describes his or her view of the relationship. By comparing an item list title 91 with a set of known keywords 97 that have been pre-determined to be important and interesting for use in categorizing items, a relationship between items 94 included in the corresponding item list 88 and the keyword 97 may be identified that may have otherwise been undetected or difficult to determine without further investigation into the item metadata.

For example, FIG. 1 shows an item list 88 with item list title 91 "Top 5 Batman Movies." Included in the item list 88 is a group of movies that a user selected to include in the item list 88. However, although the movie "The Dark Knight" does not explicitly state in the movie title that it is a Batman-themed film, further investigation in the related metadata would identify the relationship. However, since the "The Dark Knight" is listed in the illustrated item list 88 titled "Top 5 Batman Movies," the film could be identified as a Batman-themed movie based on the item list title 91 without further review of the film's metadata.

In some embodiments, the item list titles 91 for each of the item lists 88 may be compared with a set of predefined keywords 97 to identify a relationship between certain keywords 97 and items 94 that have been included in a particular item list 88. If a title term in the item list title 91 for a particular item list 88 matches one of the set of keywords 97, the items 94 that are included in the item list 88 may be marked in a way that associates the keyword 97 with each of the items 94. For example, each of the items 94 may be assigned a keyword tag that represents the particular keyword 97. If an item 94 is included in multiple item lists 88 with item list titles 91 that relate to a particular keyword 97, the item 94 may be assigned multiple keyword tags.

In other embodiments, items 94 may be associated with certain item categories based at least in part upon the determined relationship between the items 94 and certain keywords 97. For example, if an item 94 has been assigned a keyword tag associated with a particular keyword 97, that item 94 may be included in an item category that corresponds to the particular keyword 97. As such, items 94 may be categorized based upon an evaluation of the user submitted data. In the following discussion, a general description of the system and its components is provided, followed by a discussion of the operation of the same.

Figure 2:
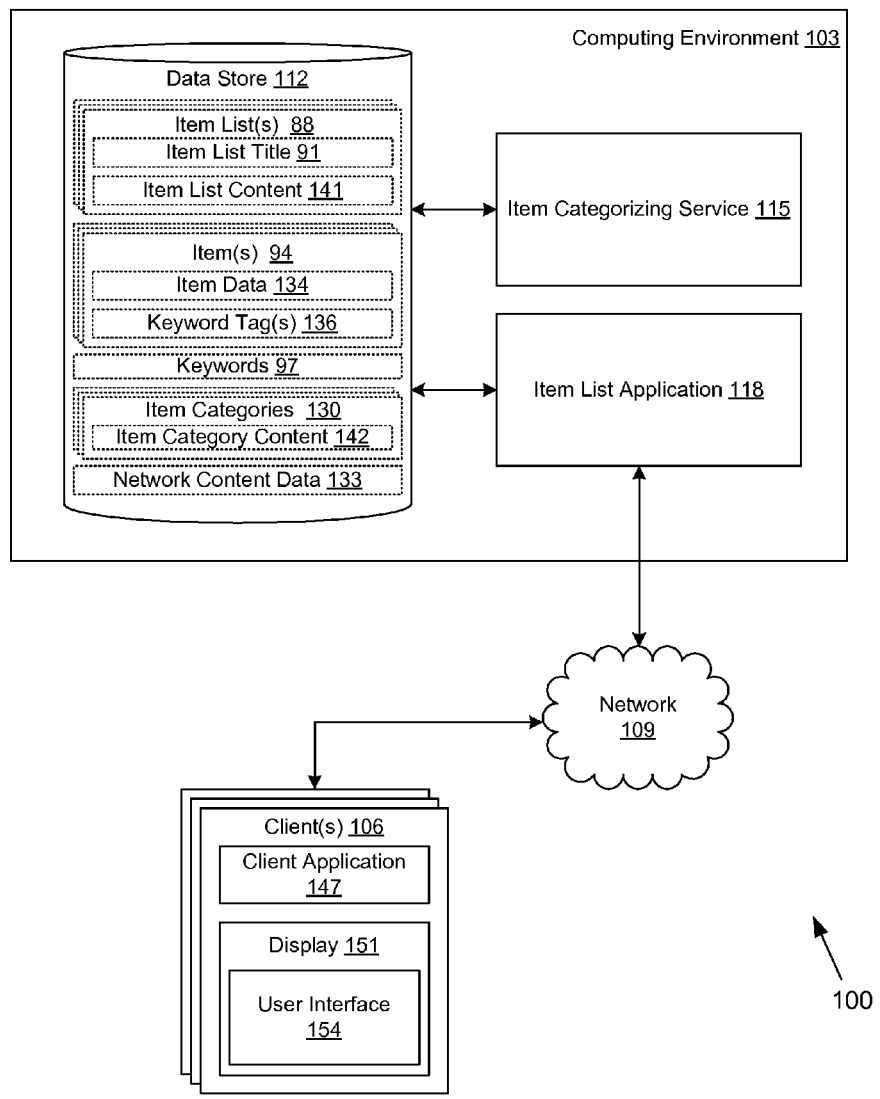
FIG. 2 is a drawing of a networked environment according to various embodiments of the present disclosure.

With reference to FIG. 2, shown is a networked environment 100 according to various embodiments. The networked environment 100 includes a computing environment 103 and a plurality of clients 106 in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an item categorizing service 115, an item list application 118 and other applications, services, processes, systems, engines, or functionality not discussed in detail herein. The item categorizing service 115 is executed to identify the relationships between items 94 that are included in user-created item lists 88 and a predefined set of keywords 97. The item categorizing service 115 identifies the relationship by comparing the item list title 91 for each item list 88 with the keywords 97. The item categorizing service 115 may also be executed to associate select items 94 with item categories 130 based at least in part on the identified relationship. The item list application 118 is executed to facilitate the creation and/or viewing of user-created item lists 88. The item list application 118 may serve up network content on a client 106 to facilitate the creation of the item lists 88. The item list application 118 may be part of another application, such as an electronic commerce application, a media information application and/or any other type of application that may include categorization of items.

For example, an electronic commerce application may be executed in order to facilitate the online purchase of items 94 over the network 109 through an electronic marketplace in which multiple merchants participate. The electronic marketplace may be operated by a proprietor who may also be a merchant. The electronic commerce application also performs various backend functions associated with the online presence of a merchant in order to facilitate the online purchase of items 94. For example, the electronic commerce application may generate network content such as web pages, mobile application data or other forms of content that are provided to clients 106 for the purposes of selecting items 94 for purchase, rental, download, lease, or other forms of consumption. User-created item lists 88 may be beneficial for all users and/or merchants of the electronic commerce application in providing more information pertaining to the items 94 that may be offered for consumption via the electronic commerce application.

Likewise, a media information application may be executed in order to provide a user access to information included in an online media database over the network 109. The online media database may include information related to media content included information related to movies, television programs, video games, audio, actors, artists, and/or any other information that relates to media content. The media information application may generate network content such as web pages, mobile application data or other forms of content that are provided to clients 106 for the purposes of displaying information relating to selected items 94. Further, user created item lists 88 may be another form of information that may be provided and accessed via the media information application. Users may select to share or view item lists 88 that define relationships between the media content included in the online media database.

The data stored in the data store 112 includes, for example, items 94, item lists 88, keywords 97, item categories 130, network content data 133, and potentially other data. Items 94 may include products, goods, services, downloads, media, and/or other items that may be offered for purchase, sale, rental, download, consumption, etc. Additionally, items 94 may include item data 134, keyword tag(s) 136 and/or any other data that may relate to items 94. Item lists 88 may include user-created lists having a selection of the items 94. Item lists 88 may include an item list title 91 and item list content 141, and/or other data. The item lists 88 are created to record and/or share a user defined relationship of items 94. For example, one user may create an item list 88 based on his or her favorite actresses. However, another user may also create an item list 88 based on his or her favorite actresses. Because each user has created an item list 88 reflecting their own subjective view of favorite actresses, the items 94 (e.g. actress names) will likely be different. The item list title 91 may be user defined and may relate to a categorization of the selection of items 94 included in the item list content 141. As such, the item list title 91 may define a relationship between the selected items 94 in a specific item list 88 based on the subjective reasoning of the user who created the list.

Keywords 97 include a predefined set of words that may be known to relate to particular items 94. Additionally, the keywords 97 may be used as elements in a taxonomy. For example, assume that the items 94 include movies and one of the keywords 97 is the word "comedy." Movies that are comedies relate to the keyword 97 "comedy." Item categories 130 are categories that are created that relate to one or more of the keywords 97. For example, one of the item categories 130 may relate to the keywords 97 "actress," "beautiful," and "drama." However, another item category 130 may only relate to the keyword 97 "actress." The item category content 142 may be populated with items 94 that are identified as relating to the keyword(s) 97 that are associated with item category 130.

Network content data 133 may include images, text, code, graphics, audio, video, and/or any other data relating to network content served up by the item list application 118. To this end, network content data 133 may include static network content or static elements of network content, for example, in hypertext markup language (HTML), extensible markup language (XML), and/or any other language suitable for creating network content. Further, network content data 133 may include code that generates dynamic network content when executed or interpreted in the computing environment 103. Such code may be written in any suitable programming language, such as PHP, Perl, Objective C, Java, Ruby, etc. Network content data 133 may also include code configured to be executed or interpreted within a client 106 in order to render dynamic network content. Such code may be referred to as applets and may be written in any suitable programming language, such as Java Script, Java, etc.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 151. The display 151 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client application 147 and/or other applications. The client application 147 may be executed in a client 106 for example, to access network content served up by the computing environment 103 and/or other servers, thereby rendering a user interface 154 on the display 151. The client application 147 may, for example, correspond to a browser, a mobile application, etc., and the user interface 154 may correspond to a network page, a mobile application screen, etc. The client 106 may be configured to execute applications beyond the client application 147 such as, for example, mobile applications, email applications, social networking applications, productivity applications and/or other applications.

Next, a general description of the operation of the various components of the networked environment 100 is provided. To begin, a user may create an item list 88 that includes a selection of items 94. The user may want to create item list 88 to record and/or share a personalized characterization of items 94. As such, the user-created item list 88 reflects a relationship between the items 94 included in the item list 88 based on the user's subjective view. The user may record this list for personal records and/or may share the item list 88 with other users who may find the list interesting based on the defined relationship. For example, assume two item lists 88 contain items 94 relating to the best action films. One item list 88 may include a movie that the second item 88 does not include. Users interested in consuming information related to action films may find it interesting to view the opinion of other users with respect to what items should or should not belong lists related to the best action films.

Each item list 88 may have an item list title 91 that may be defined by a user to describe a relationship of items 94 included in the item list 88. By evaluating both the user-defined item list titles 91 of multiple user-created lists 88, a relationship between items 94 and keywords 97 may be identified that otherwise may not have been identified. Accordingly, item categories 130 based at least in part upon one or more of a set of predefined keywords 97 may be created and/or identified, and eventually populated with items 94 that are identified to relate based at least on items lists titles 91.

In some embodiments, the item list application 118 may facilitate the creation of item lists 88. The item list application 118 may serve up network content over a network 109 to a client 106. The network content may be accessible to a user via a user interface 154 rendered by a client 106. Via the user interface 154, a user may create an item list 88 by defining the item list title 91 and selecting items 94 to include in the item list content 141. For example, if the user-created an item list 88 of movies that related to action movies, the user may define the item list title 91 "Best Action Movies," and then proceed to select the items 94 that that the user believes should be included in his or her item list 88 of best action movies. For example, if the user believes that "The Terminator" is one of the best action movies, the user would likely select the movie "The Terminator" to be included in his or her item list 88 titled "Best Action Movies." Multiple users may create item lists 88 which may be stored in an item registry in one or more data stores 112. Additionally, a user may be able to share their item lists 88 with other users.

In other embodiments, the item categorizing service 115 may examine the item list title 91 for each item list 88 in an item list registry to detect a relationship between the items 94 included in the item list 88 and a predefined set of keywords 97. In one example, the item categorizing service 115 may parse the item title 91 into title terms which each represent the different words of the item list title 91. For example, if the item list title 91 is "My Favorite Action Movies," the item categorizing service 115 may parse the item list title 91 into the title terms "My" "Favorite" "Action" and "Movies." Each of these title terms may be used to determine a relationship between a common list of predefined keywords 97 and the items 94 included in each of the item lists 88.

In some embodiments, the item categorizing service 115 may first determine if any of the title terms are considered stopwords. Stopwords in general typically comprise common words that are not indexed for searching due to their insignificance or commonality. For example, stopwords may include the words "a," "the," "it," "that," "at," "as," "to," "my," and/or other common words. If the item categorizing service 115 determines that one of the title terms is a stopword it may no longer consider that title term when categorizing items 94. As such, using the example above, the item categorizing service 115 may decide to ignore the title term "My" if it is be considered a stopword. In deciding whether a particular term is considered a stopword, the item categorizing service 115 may compare each of the title terms with a predefined list of stopwords accessible to the item categorizing service 115 via the data store 112.

In other embodiments, the item categorizing service 115 may compare the title terms with a set of predefined keywords 97. The predefined keywords 97 may be a list of words that have already been determined to be useful in characterizing items. For example, if the items 94 consist of movies, some of predefined keywords 97 may include words such as "action," "romance," "actress," "batman," "heroes," "horror," "science fiction", "weddings," "princess," "villain," and/or any other type of word that may be used to categorize movies. It should be noted that although the items 94 discussed herein relate to movies, the categorizing method may be used for any type of item.

Additionally, the item categorizing service 115 may also limit the keywords 97 that may be compared to the title terms. For example, if the keywords 97 have an associated rating based on the most popular keywords 97, the item categorizing system may only select a specific percentage value or predefined threshold number of keywords 97. For example, if the terms "horror," "drama," "comedy," and "romance" are considered in the top ten percent of useful keywords 97 but the terms "yellow," "dog," "baby," and "beach" have not been considered top keywords 97 for categorizing items 94, the item categorizing service 115 may only select the top ten percent of keywords 97 rather than all of the predefined keywords 97.

The item categorizing service 115 may compare each or some of the title terms in an item list title 91 for an item list 88 with the keywords 97. If none of the title terms match any of the keywords 97 then the particular item list 88 will be ignored by the item categorizing service 115 and no longer considered useful in determining whether to populate an item category 130 with related items 94. For example, assume the item list title 91 is "Watched in 2012" and the user included all of the movies that he or she watched in the year 2012. However, assume that none of the title terms "Watched" "in" or "2012" are included in the set of keywords 97 since none of those words may be considered interesting or useful enough alone to categorize movies.

However, if a match is detected between one of the keywords 97 and at least one of the title terms from the item list title 91, the item categorizing service 115 may track the amount of times an item 94 is included in item lists 88 that include an item list title 91 with a title term that matches a keyword 97. In one example, the item categorizing service 115 may assign a keyword tag 136 associated with a matching keyword 97 to each of the items 94 included in the particular item list 88. For example, assume that the item list title 91 is "Princess Movies," and one of the keywords 97 is "princess." Further assume that the item list 88 includes the movies "Sleeping Beauty," "Little Mermaid," and "The Princess Diaries." Upon detection of the matching keyword 97, the item categorizing service 115 may assign a keyword tag 136 associated with the term "princess" to each of the movies in the item list 88. Therefore, the movie "Sleeping Beauty" would have a keyword tag 136 assigned to it since it was included in an item list 88 that had a title term in its item list title 91 that match the keyword 97 "princess."

Further, the item categorizing service 115 may evaluate all or a portion of the item lists 88 in the item list registry to determine whether any of the title terms for each item list title 91 matches any of the keywords 97. As such, each time the item categorizing service 115 detects a matching keyword 97 in the item list title 91 of a respective item list 88, the item categorizing service 115 will assign a keyword tag 136 associated with the matching keyword 97 to each of the items 94 included in the item list 88. Therefore, all items 94 that are included in one or more item lists 88 having at least one matching keyword 97 in the respective item list title 91 will be assigned a keyword tag 136 that is associated with a matching keyword 97. For example, if the movie "Sleeping Beauty" is included in two items lists 88 that each including the keyword 97 "princess" in the respective item list title 91, the movie "Sleeping Beauty" would be assigned two keyword tags 136 that are associated with the keyword 97 "princess."

In other embodiments, the item categorizing service 115 may dynamically create item categories 130 based at least in part upon the predefined keywords 97. The item categories 130 may each relate to one or more of the predefined keywords 97. For example, the item categorizing service 115 may create an item category 130 which is directly related to the keyword "Batman." As such, the item category 130 may be populated with only items 94 that are related to the "batman" keyword 97. Likewise, an item category 130 may be created that is related to superheroes, but corresponds to the keywords 97 "Hulk," "Marvel" "Spiderman" "superhero" "Batman," and/or other keywords 97 that relate to superheroes.

The item categorizing service 115 may associated item categories 130 with items 94 based at least in part upon the item list titles 91 and keywords 97. As such, an item category 130 may be populated with items 94 that have been determined to relate to a keyword 97 associated with the item category 130 based in part whether the item 94 is included in an item list 88 with an item list title 91 having a title term that matches the keyword 97 that is associated with the item category 130.

In one example, if an item 94 has at least one keyword tag that is associated with a particular keyword 97, the item 94 will be associated with an item category 130 that is related to that particular keyword 97. For example, any items 94 that have a keyword tag 136 that is associated with the term "Batman" would be added to an item category 130 created based on the keyword 97 "Batman."

In another example, the item categorizing service 115 may determine how many item list titles 91 have a particular keyword 97. Accordingly, the item categorizing service 115 may select a percentage of item lists 88 that include a particular item 94 by determining the number of item lists titles 91 having a particular keyword 97 and the number of keyword tags 136 associated with that particular keyword 97 that are assigned to each of the items 94. As such, the item categorizing service 115 may only populate an item category 130 associated with the keyword 97 with items 94 that are included in a predefined percentage value of item lists 88 that are associated with the keyword 97. For example, assume that there are one hundred item lists 88 that include the keyword 97 "comedy" in their respective item lists titles 91. Further assume that the item 94 comprising the movie "Star Wars" is included in two of those item lists 88, and the item 94 comprising the movie "Caddyshack" is included in ninety of the item lists 88. If the predefined percentage is eighty percent, the item category 130 associated with the keyword 97 "comedy" may be populated with the item 94 comprising the movie "Caddyshack," but not the item 94 comprising the movie "Star Wars."

In some embodiments, the predefined percentage value may be adjusted over time based at least in part upon behavior analysis. For example, assume that the predefined percentage value is originally set at fifty percent. Therefore, items 94 included in at least fifty percent of the items lists 88 that each include a title term that matches the same keyword 97 will be associated with an item category 130 associated with the same keyword 97. However, assume it is determined based on further analysis that there some items 94 that should be added to the item category 130, but are not being added to an item category 130 because they do not appear in the predefined percentage value of item lists 88. As such, the predefined percentage value may be adjusted to a lower value to accommodate the items 94 that should be added. Additionally, the predefined percentage value may be increased if it is determined that some of the items 94 that are being added to the item category 130 based on the original predefined percentage value should not be added to the item category 130.

In another example, the item categorizing service 115 may populate item categories 130 based on a number of keyword tags 136 assigned to an item 94 that also correspond to the keyword 97 that relates to a respective item category 130. For example, there may be a predefined category threshold having a numerical value (e.g. 250). Therefore, if an item 94 is assigned a number of keyword tags 136 associated with a keyword 97 that meets or exceeds the predefined category threshold, the item 94 may be added to an item category 130 related to the keyword 97 corresponding to the particular keyword 97. For example, assume the item category 130 to be populated is related to the keyword 97 "comedy" and the predefined category threshold is one hundred. Further assume that the item 94 comprising the movie "Caddyshack" has two hundred keyword tags 136 associated with the keyword 97 "comedy" and the item 94 comprising the movie "Star Wars" has only two keyword tags 136 associated with the keyword 97 "comedy." The item 94 comprising the movie "Caddyshack" will be added to the item category 130 associated with "comedy" because it exceeds the required number of keyword tags 136, while the item 94 comprising the movie "Star Wars" will not be added since it does not meet or exceed the required predefined category threshold.

By evaluating the user-created item list titles 91 and the item list content 141 from the item lists 88, the item categorizing service 115 may dynamically create the item categories 130 and categorize items 94 based at least in part on the user submitted data. In some embodiments, the item categorizing service 115 may periodically update the item categories 130. In other embodiments, the item categorizing service 115 may update the item categories 130 following the creation of new item lists 88.

In some embodiments, the set of keywords 97 may change. For example, keywords 97 may be added, deleted, and/or modified. As such, the item categorizing service 115 may detect a change in the set of keywords 97. When a change in the set of keywords 97 is detected, the item categorizing service 115 may restart the keyword tagging procedure and re-populate the item categories 130 based at least in part on the updated data. For example, assume that the keyword "basketball" is added to the set of keywords. The item categorizing service 115 may re-evaluate the item lists 88, and items 94 including in item lists 88 that contain the word "basketball" in the item list title 91 will be associated with a keyword tag 136 corresponding to the keyword 97 "basketball." Additionally, a new item category 130 may be created that is associated with the word "basketball." Accordingly, the item category 130 will be populated with the items 94 that meet the predefined percentage value or predefined category threshold value of keyword tags 136 associated with the keyword 97 "basketball."

Figure 3:
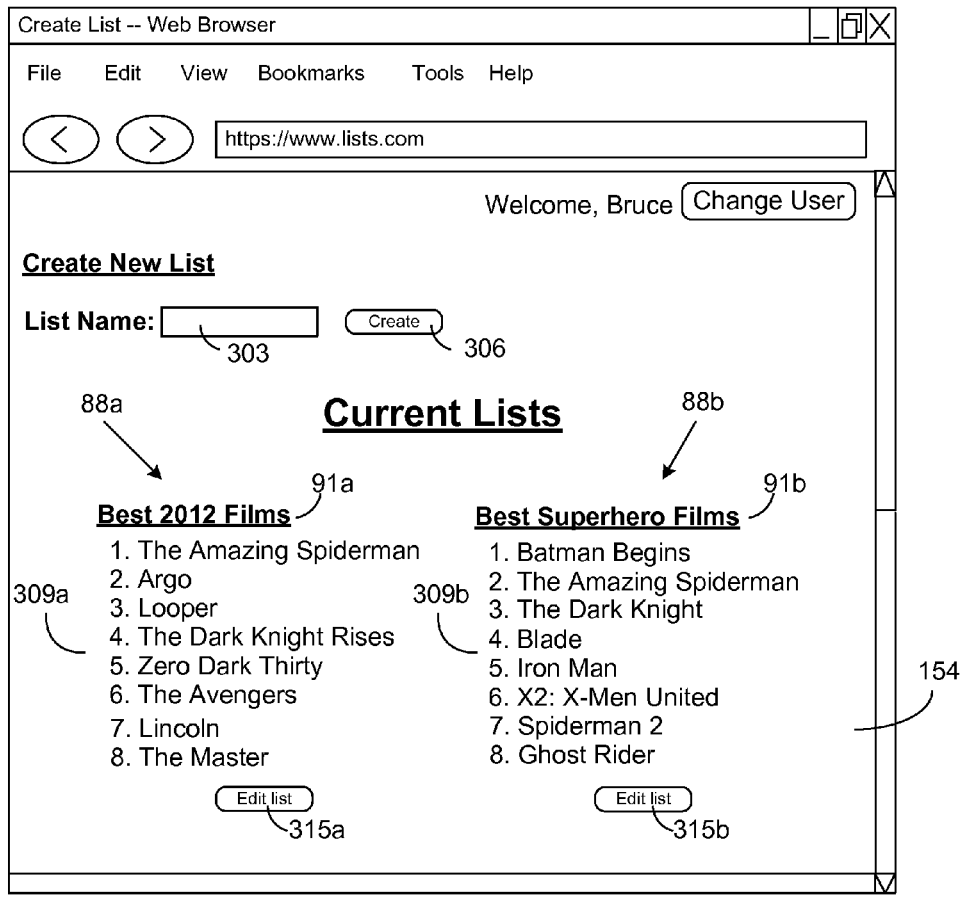
FIG. 3 is a drawing of an example of a user interface rendered by a client in the networked environment of FIG. 2 according to various embodiments of the present disclosure.

Referring next to FIG. 3, shown is a drawing of an example of a user interface 154 (FIG. 2) rendered by a client 106 (FIG. 2) in the networked environment 100 (FIG. 2) according to various embodiments of the present disclosure. In particular, FIG. 3 depicts an example of an item list display view 300 rendered by a client application 147 (FIG. 2) executing on the client 106.

The item list display view 300 may include a create title input 303, create list component 306, item lists 88a, 88b, item list titles 91a, 91b, selected list items 309a, 309b, edit list component 315a, 315b, and/or any other information and/or components relevant to the creating and display of item lists 88. A user may input a new item list title 91 into the create title input 303. By selecting the create list component 306, a user may submit a request to create an item list 88 having an item list title 91 entered into the create title input 303. Additionally, the item list display view 300 may include already created item lists 88 associated with a specific user. Selection of the edit list component 315a, 315b corresponding to a particular item list 88 may facilitate the addition, deletion, and/or alteration of the previously created item list 88.

Figure 4:
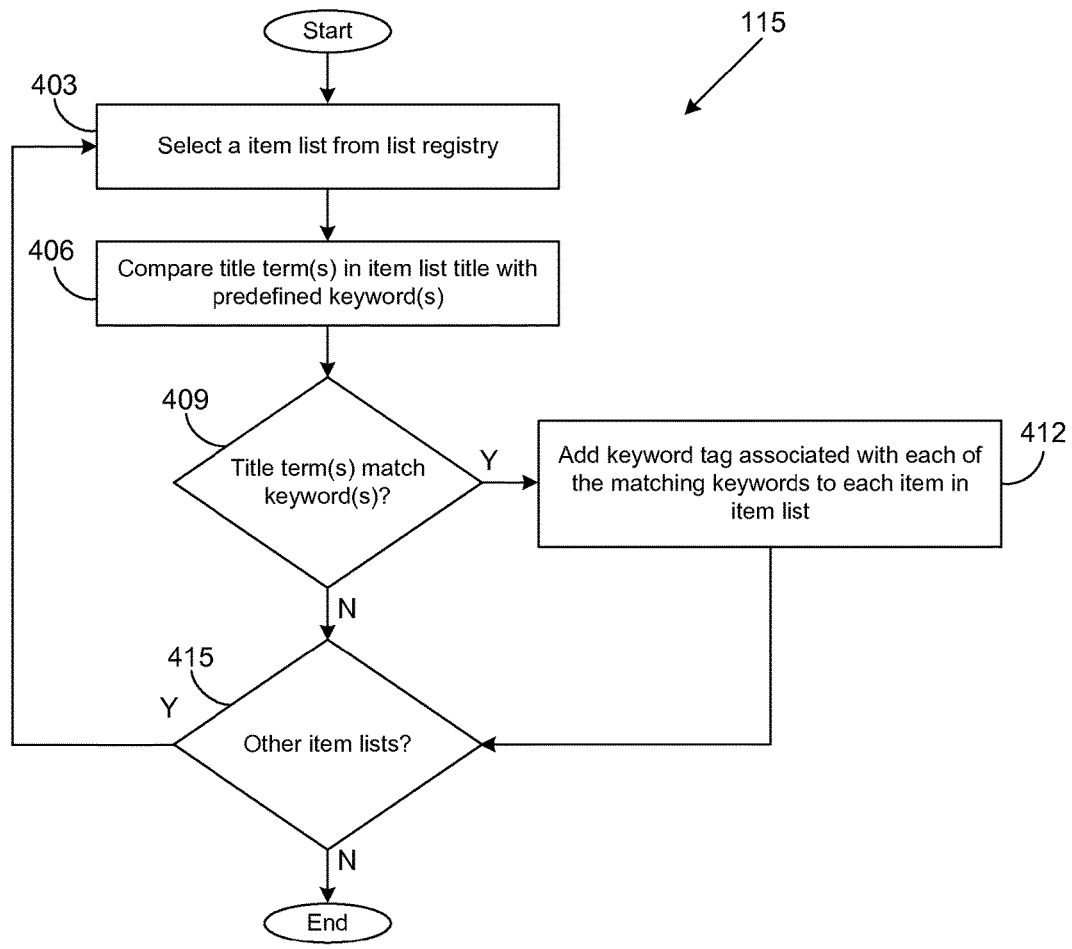
FIGS. 4-5 are flowcharts illustrating examples of functionality implemented as portions of an item categorizing service executed in a computing environment in the networked environment of FIG. 2 according to various embodiments of the present disclosure.

Moving on to FIG. 4, shown is a flowchart that provides one example of the operation of a portion of the item categorizing service 115 according to various embodiments. It is understood that the flowchart of FIG. 4 provides merely an example of the many different types of functional arrangements that may be employed to implement the operation of the portion of the item categorizing service 115 as described herein. As an alternative, the flowchart of FIG. 4 may be viewed as depicting an example of steps of a method implemented in the computing environment 103 (FIG. 2) according to one or more embodiments.

Specifically, FIG. 4 provides an example of the functionality that may be performed surveying the item lists 88 in the item registry to determine whether any of the corresponding item list titles 91 include a title term that matches one of the keywords 97. As such, the item categorizing service 115 identifies relationships between items 94 included in item lists 88 and certain keywords 97 based at least in part on whether the items 94 are included in item lists 88 having item list titles 91 that relate to the certain keywords 97.

Beginning with box 403, the item categorizing service 115 may select an item list 88 from an item list registry. The item lists 88 are user-created lists of selected items 94 that correspond to user defined item list titles 91. The item list registry may include item lists 88 created by one or more users via an item list application 118.

In box 406, the item categorizing service 115 compares the predefined keywords 97 with the title terms included in the item list title 91 of the selected item list 88. As previously discussed, the predefined keywords 97 may be the full list of keywords 97 or a subset of the keywords 97. In box 409, the item categorizing service 115 determines whether any of the title terms in the item list title 91 match any one of the predefined keywords 97. If any of the title terms match any of the keywords 97, the item categorizing service 115 proceeds to box 412. Otherwise, the item categorizing service 115 proceeds to box 415.

In box 412, the item categorizing service 115 assigns a keyword tag 136 associated with the matching keyword 97 to each of the items 94 included in the selected item list 88. If the item list title 91 has more than one title terms and multiple title terms match multiple keywords 97 then the item categorizing service 115 assigns keyword tags 136 associated with each of the matching keywords 97 to each of the items 94 included in the item list 88. For example, assume that the item list title 91 is "Best Eastwood Westerns." Further assume that both "Westerns" and "Eastwood" are included in the set of keywords 97. The items 94 that are including in the item list 88 may be assigned a keyword tag 136 associated with the keyword 97 "Westerns" and a keyword tag 136 associated with the keyword 97 "Eastwood."

In box 415, the item categorizing service 115 determines whether there are any other item lists 88 in the item registry that need to be examined. If there are other item lists 88, the item categorizing service 115 proceeds to box 403. Otherwise, this portion of the item categorizing service 115 ends.

Figure 5:
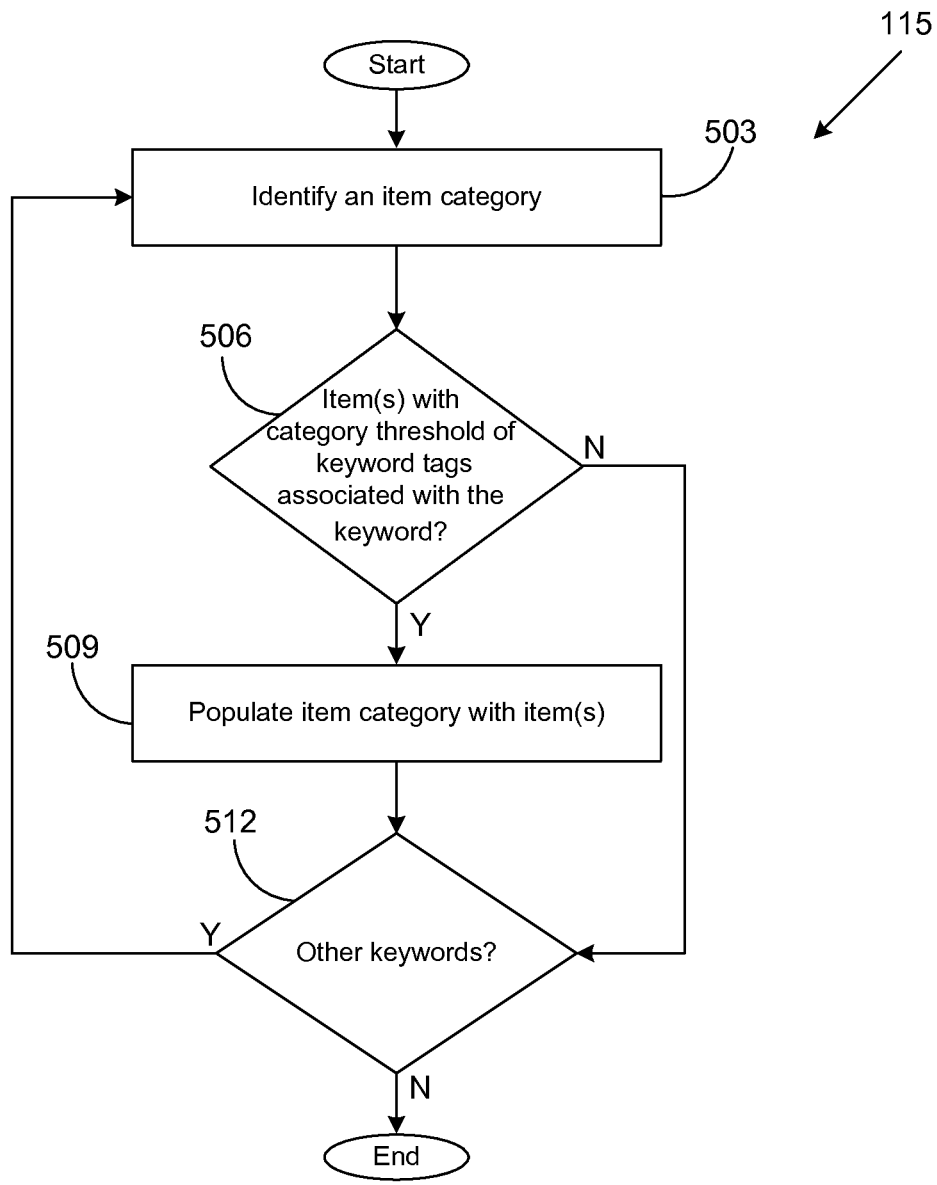

Referring next to FIG. 5, shown is a flowchart that provides one example of the operation of a portion of the item categorizing service 115 according to various embodiments. It is understood that the flowchart of FIG. 5 provides merely an example of the many different types of functional arrangements that may be employed to implement the operation of the portion of the item categorizing service 115 as described herein. As an alternative, the flowchart of FIG. 5 may be viewed as depicting an example of steps of a method implemented in the computing environment 103 (FIG. 2) according to one or more embodiments.

Specifically, FIG. 5 categorizes items 94 into particular item categories 130 based in part on the comparison of the item lists title 91 with the keywords 97 for each of the item lists 88. As such, the population of the item categories 130 accents the identification of the relationships between certain items 94 and a set of keywords 97.

Beginning with box 503, the item categorizing service 115 identifies an item category 130. The item category 130 may be one of multiple item categories 130. The item category 130 may be previously created or may be created based on at least one keyword 97. An item category 130 corresponds to with one or more keywords 97. For example, one item category 130 may be directly related to one keyword 97 (e.g. "Comedy") while another item category 130 may be related to multiple keywords 97 (e.g. "Comedy" and "Romance"). Additionally, the item category 130 may be one of multiple item categories 130.

In box 506, the item categorizing service 115 determines whether there are any items 94 that have a category threshold of keyword tags 136 that are related to the keyword(s) 97 corresponding to the identified item category 130. A predefined category threshold may be a value that represents a number of keyword tags 136 associated with a particular keyword 97 that should be assigned to an item 94 for the item 94 to be included into the respective item category 130.

As discussed in detail in reference to FIG. 4, items 94 that are included in item lists 88 that have an item list title 91 with a title term matching a keyword 97 may be assigned a keyword tag 136 associated with the matching keyword 97. As such, an item 94 may have multiple keyword tags 136 associated with the same keyword 97 if the item 94 is included in multiple item lists 88 that each have the same keyword 97 included in the respective item list title 91. Therefore, if, for example, an item 94 has five item keyword tags associated with a particular keyword 97 (e.g., "Action") and the predefined category threshold is fifty, the item 94 would not meet or exceed the predefined category threshold and would be ignored. If there are not any items 94 that meet or exceed the category threshold of keyword tags 136 associated with the keyword(s) 97 that corresponds to the identified item category 130, the item categorizing service 115 proceeds to box 512. Otherwise, the item categorizing service 115 proceeds to box 509.

In box 509, the item categorizing service 115 populates the identified item category 130 with the items 94 that are assigned a number of keyword tags 136 that meet or exceed the predefined category threshold. As such, the items 94 are now associated with the with the item category 130. In box 512, the item categorizing service 115 determines whether there are any other item categories 130. As previously stated, each item category 130 relates to one or more of the predefined keywords 97. Therefore, if there are other item categories 130 that may be identified based least on the keywords 97, the item categorizing service 115 proceeds to box 503. Otherwise, the portion of the item categorizing service 115 ends.

Figure 6:
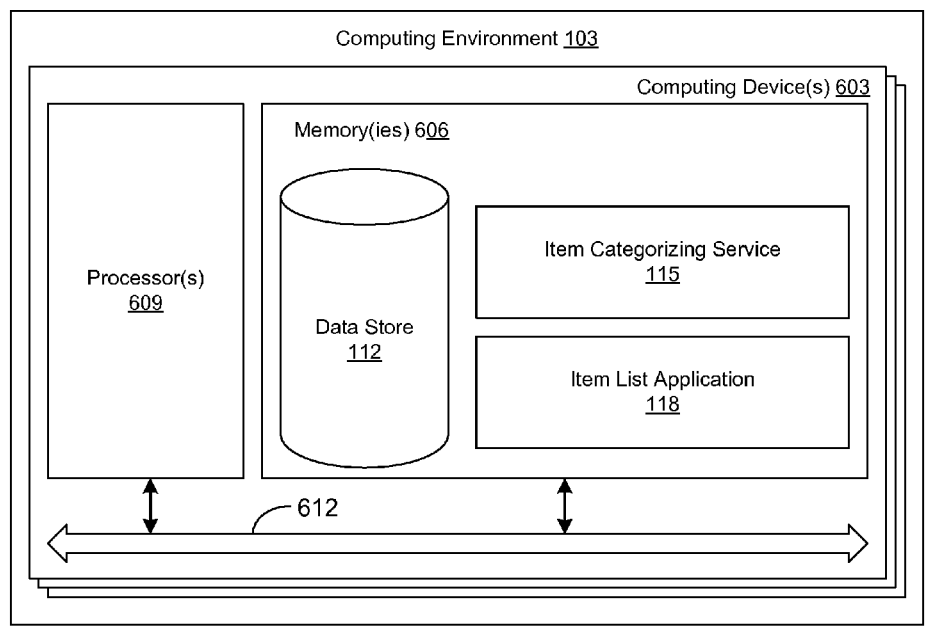
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 103 according to an embodiment of the present disclosure. The computing environment 103 includes one or more computing devices 603. Each computing device 603 includes at least one processor circuit, for example, having a processor 609 and a memory 606, both of which are coupled to a local interface 612. To this end, each computing device 603 may comprise, for example, at least one server computer or like device. The local interface 612 may comprise, for example, a data bus with an accompanying address/control bus or other bus structure as can be appreciated.

Stored in the memory 606 are both data and several components that are executable by the processor 609. In particular, stored in the memory 606 and executable by the processor 609 are an item categorizing service 115, an item list application 118 and potentially other applications. Also stored in the memory 606 may be a data store 112 and other data. In addition, an operating system may be stored in the memory 606 and executable by the processor 609.

It is understood that there may be other applications that are stored in the memory 606 and are executable by the processor 609 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 609. In this respect, the term "executable" means a program file that is in a form that can ultimately be run by the processor 609. Examples of executable programs may be, for example, a compiled program that can be translated into machine code in a format that can be loaded into a random access portion of the memory 606 and run by the processor 609, source code that may be expressed in proper format such as object code that is capable of being loaded into a random access portion of the memory 606 and executed by the processor 609, or source code that may be interpreted by another executable program to generate instructions in a random access portion of the memory 606 to be executed by the processor 609, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 609 may represent multiple processors 609 and/or multiple processor cores and the memory 606 may represent multiple memories 606 that operate in parallel processing circuits, respectively. In such a case, the local interface 612 may be an appropriate network that facilitates communication between any two of the multiple processors 609, between any processor 609 and any of the memories 606, or between any two of the memories 606, etc. The local interface 612 may comprise additional systems designed to coordinate this communication, including, for example, performing load balancing. The processor 609 may be of electrical or of some other available construction.

Although the item categorizing service 115, the item list application 118 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the item categorizing service 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 609 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item categorizing service 115, that comprises software or code can be embodied in any non-transitory computer-readable medium for use by or in connection with an instruction execution system such as, for example, a processor 609 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:

generate a user interface to facilitate creation of a plurality of user-created item lists via a plurality of client devices;

receive the plurality of user-created item lists from the plurality of client devices via the user interface rendered on the plurality of client devices;

maintain the plurality of user-created item lists in an item list registry, individual user-created item lists of the plurality of user-created item lists including a plurality of items available for purchase, lease, or download via an electronic commerce system, and the individual user-created item lists being identified by a respective item list title that includes a title term;

for the individual user-created item lists, compare the title term with a plurality of predefined keywords;

for the individual user-created item lists, assign a keyword tag associated with a respective predefined keyword of the plurality of predefined keywords to individual items of the plurality of items included in a respective user-created item list of the plurality of user-created item lists in response to the respective predefined keyword matching the title term;

create an item category associated with the respective predefined keyword; and populate the item category with at least one of the plurality of items when a number of keyword tags corresponding to the respective predefined keyword and assigned to the at least one of the plurality of items reaches a predefined category threshold.

2. The non-transitory computer-readable medium of claim 1, wherein the user interface comprises one or more components for facilitating the creation of a particular user-created item list of the plurality of user-created item lists.

3. The non-transitory computer-readable medium of claim 1, wherein, when executed, the program causes the at least one computing device to at least compare the title term with a plurality of stopwords, the title term being compared to the plurality of predefined keywords in response to the title term failing to match any one of the plurality of stopwords.

4. The non-transitory computer-readable medium of claim 1, wherein the item category is associated with an additional predefined keyword of the plurality of predefined keywords.

5. The non-transitory computer-readable medium of claim 1, wherein a first item of the plurality of items in a first item list of the plurality of user-created item lists is the same as a second item of the plurality of items in a second item list of the plurality of user-created item lists.

6. The non-transitory computer-readable medium of claim 1, wherein, when executed, the program causes the at least one computing device to at least determine a number of the plurality of user-created item lists having a respective title term that matches the respective predefined keyword.

7. A system, comprising:
at least one computing device; and an item categorizing service executable in the at least one computing device, wherein, when executed, the item categorizing service causes the at least one computing device to at least:
  generate a user interface to facilitate creation of a plurality of user-created item lists via a plurality of client devices;
  receive the plurality of user-created item lists from the plurality of client devices via the user interface rendered on the plurality of client devices;
  maintain the plurality of user-created item lists in an item list registry, individual user-created item lists of the plurality of user-created item lists including a plurality of items available for purchase, lease, or download via an electronic commerce system, and the individual user-created item lists being identified by a respective item list title that includes a title term;
  obtain a particular item list of the plurality of user-created item lists from the item list registry;
  compare the title term of the particular item list with a plurality of predefined keywords;
  assign a keyword tag associated with a particular predefined keyword of the plurality of predefined keywords to individual items of the plurality of items included in the particular item list in response to the title term matching the particular predefined keyword;
  create an item category associated with the particular predefined keyword; and
  populate the item category associated with the particular predefined keyword with a particular item of the plurality of items based at least in part upon a number of keyword tags assigned to the particular item reaching a predefined threshold.

8. The system of claim 7, wherein the individual user-created item lists of the plurality of user-created item lists are created by a respective user of a plurality of users, and the respective user-created item list title for the individual item lists is defined by the respective user.

9. The system of claim 7, wherein the particular item list is a first item list of the plurality of user-created item lists, and a first item of the plurality of items in the first item list is the same as a second item of the plurality of items in a second item list of the plurality of user-created item lists.

10. The system of claim 7, wherein the particular item list is a first item list of the plurality of user-created item lists, and the title term of the first item list and the title term of a second item list of the plurality of user-created item lists both match a same predefined keyword of the plurality of predefined keywords.

11. The system of claim 7, wherein, when executed, the item categorizing service further causes the at least one computing device to at least determine a number of the plurality of user-created item lists having a respective title term that matches the particular predefined keyword.

12. The system of claim 11, wherein the item category is populated with the particular item when a ratio of the number of keyword tags to the number of the plurality of user-created item lists reaches a predefined percentage value.

13. The system of claim 7, wherein the title term is a particular title term of a plurality of title terms, and, when executed, the item categorizing service further causes the at least one computing device to at least:
  determine whether the particular title term of the plurality of title terms matches a particular stopword of a plurality of stopwords; and
  compare the particular title term with at least one of the plurality of predefined keywords when the particular title term fails to match any one of the plurality of stopwords.

14. The system of claim 7, wherein the item category is a particular item category of a plurality of item categories, and, when executed, the item categorizing service further causes the at least one computing device to create the plurality of item categories, individual ones of the plurality of item categories being associated with a respective predefined keyword of the plurality of predefined keywords.

15. A method, comprising:
  generating, by at least one computing device, a user interface to facilitate creation of a plurality of user-created item lists via a plurality of client devices;
  receiving, by the at least one computing device, the plurality of user-created item lists from the plurality of client devices via the user interface rendered on the plurality of client devices;
  maintaining, by the at least one computing device, an item list registry including the plurality of user-created item lists, individual item lists of the plurality of user-created item lists including a respective plurality of items and having a respective item list title;
  for the individual item lists, comparing, by the at least one computing device, at least one title term of the respective item list title with a plurality of predefined keywords;
  for the individual item lists, assigning, by the at least one computing device, a keyword tag associated with a particular predefined keyword of the plurality of predefined keywords to individual items in the respective plurality of items in response to the particular predefined keyword matching the at least one title term;
  creating, by the at least one computing device, an item category associated with the particular predefined keyword; and
  populating, by the at least one computing device, the item category with at least one of the plurality of items included in a particular item list of the plurality of user-created item lists when a number of keyword tags corresponding to the particular predefined keyword and assigned to the at least one of the plurality of items reaches a predefined threshold.

16. The method of claim 15, wherein the user interface comprises one or more components for facilitating user creation of the particular item list plurality of user-created item lists.

17. The method of claim 15, wherein the individual item lists are created by a respective user of a plurality of users, the respective user defining the respective item list title for the respective item list via the user interface rendered on a respective client device and selecting, via the user interface, at least one of the plurality of items to be included in the respective item list.

18. The method of claim 15, wherein a first item of the respective plurality of items in a first item list is the same as a second item of the respective plurality of items in a second item list.

19. The method of claim 15, wherein the at least one title term in the respective item list title being associated with a first item list of the plurality of user-created item lists is the same as the at least one title term in the respective item list title associated with a second item list of the plurality of user-created item lists.

20. The method of claim 15, wherein the at least one title term is only compared to the plurality of predefined keywords in response to the at least one title term failing to match a stopword.

* * * * *